United States Patent [19]

Hatanaka et al.

[11] Patent Number: 5,375,114
[45] Date of Patent: Dec. 20, 1994

[54] RECORDING AND READING SPACE CONTROL BETWEEN A READ/WRITE PROBE AND A RECORDING MEDIUM

[75] Inventors: Katsunori Hatanaka, Yokohama; Kunihiro Sakai, Isehara; Haruki Kawada, Yokohama; Ryo Kuroda, Machida, all of Japan

[73] Assignee: Canon Kabushiki Kaisha, Tokyo, Japan

[21] Appl. No.: 212,641

[22] Filed: Mar. 14, 1994

Related U.S. Application Data

[63] Continuation of Ser. No. 870,265, Apr. 17, 1992, abandoned.

[30] Foreign Application Priority Data

Apr. 24, 1991 [JP] Japan ................................. 3-094380

[51] Int. Cl.⁵ .............................................. G11B 7/00
[52] U.S. Cl. .................................... 369/126; 369/101; 369/43; 365/151; 365/118; 250/306; 250/310
[58] Field of Search .................. 369/126, 101, 43; 250/492.3, 492.2, 306, 307, 310, 311; 365/151, 118, 174

[56] References Cited

U.S. PATENT DOCUMENTS

| | | | |
|---|---|---|---|
| 5,161,149 | 11/1992 | Potember et al. | 369/126 |
| 5,222,060 | 6/1993 | Kuroda et al. | 369/126 |
| 5,255,258 | 10/1993 | Kawade et al. | 369/126 |
| 5,287,342 | 2/1994 | Kishi et al. | 369/126 |
| 5,299,184 | 3/1994 | Yamano et al. | 369/126 |

FOREIGN PATENT DOCUMENTS

| | | |
|---|---|---|
| 0272935 | 6/1988 | European Pat. Off. |
| 61-80536 | 4/1986 | Japan |
| 63-161552 | 7/1988 | Japan |
| 63-161553 | 7/1988 | Japan |
| 1133239 | 5/1989 | Japan |
| 2310867 | 12/1990 | Japan |
| 0427806 | 1/1992 | Japan |

OTHER PUBLICATIONS

Physical Review Letters, "Surface Studies by Scanning Tunneling Microscopy", Binning et al. vol. 49, No. 1, Jul. 1982, pp. 57-60.

*Primary Examiner*—Paul M. Dzierzynski
*Assistant Examiner*—Kim-Kwok Chu
*Attorney, Agent, or Firm*—Fitzpatrick, Cella, Harper & Scinto

[57] ABSTRACT

In order to effect the reading-out of a signal from a recording medium at a high speed and without the collision of a probe electrode, the control of the spacing between the probe electrode and the signal recording layer of the recording medium is effected by sampling a tunnel current detected by the probe electrode at the timing of a reproduction clock, and reproduction is effected with this sampled value as a reference. Also, in order to effect information recording with good reproducibility and at high density, the control variable of a servo control circuit for controlling the spacing between the probe electrode and the recording layer is changed over during the periods before and after a writing pulse is applied to the probe electrode. Also, in order to effect re-recording reliably, the prior recorded state at the re-writing position is detected, and from the result of this detection, an optimal servo control variable, the waveform of a pulse voltage applied, etc. are set.

12 Claims, 5 Drawing Sheets

RECORDING AND READING SPACE CONTROL BETWEEN A READ/WRITE PROBE AND A RECORDING MEDIUM

This application is a continuation of application Ser. No. 07/870,265 filed Apr. 17, 1992, now abandoned.

BACKGROUND OF THE INVENTION

1. Field of the Invention

This invention relates to an apparatus such as a memory apparatus for effecting super-high density information recording (erasing) and/or reproduction by the use, for example, of a tunnel current.

2. Related Background Art

Semiconductor memories and magnetic memories using a magnetic material or a semiconductor as a material have heretofore been the mainstream, but in recent years, with the advancement of the laser technique, inexpensive and highly dense recording mediums using optical memories using organic thin film of organic coloring matters, photopolymer or the like have made their advent.

On the other hand, recently, a scanning type tunnel microscope (hereinafter abbreviated as STM) through which the electron structure of the surface atom of a conductor can be directly observed has been developed [G. Binning et al., *Phys. Rev. Lett.*, 49, 57 (1982)] and measurement of high resolving power of a real spatial image has become possible irrespective of single crystal or an amorphous material, and STM has the advantage that it can observe with low electric power without imparting any damage by a current to a sample and further, can operate even in the atmosphere and can be used for various materials and therefore, wide applications thereof are expected.

The STM utilizes the fact that when a voltage is applied between a metallic probe (probe electrode) and an electrically conductive substance and the probe is brought close to the substance to a distance on the order of 1 nm, a tunnel current flows. This current is very sensitive to any variation in the distance between the two. By scanning the probe so as to keep the tunnel current constant, various kinds of information regarding all electron clouds in a real spatial image can also be read. In this case, the resolving power in the in-plane direction is on the order of 0.1 nm.

Accordingly, if the principle of the STM is applied, it will be possible to effect high-density recording and reproduction sufficiently at the atom order (subnamometer). For example, in the recording-reproducing apparatus disclosed in Japanese Laid-Open Patent Application No. 61-80536, atomic particles adhering to the surface of a medium are removed by an electron beam or the like to thereby effect writing, and this data is reproduced by an STM.

A method of effecting recording and reproduction in an STM by the use of a thin film layer of a material having a memory effect for the switching characteristic of a voltage or a current, for example, $\pi$ electron line organic compound or a chalcogen compound, as a recording layer is disclosed in Japanese Laid-Open Patent Application No. 63-161552, Japanese Laid-Open Patent Application No. 63-161553, etc. According to this method, if the bit size of recording is 10 nm, recording and reproduction of a capacity as great as $10^{12}$ bit/cm$^2$ is possible.

To effect recording or reproduction on a memory medium in an actual apparatus, it is necessary to maintain and stabilize the spacing between the recording layer and the probe electrode at a distance over which a tunnel current flows. So, heretofore, the control of the spacing has been effected so that the average spacing between the recording layer and the probe electrode may assume a predetermined value, that is, the average value of the tunnel current may be a predetermined value. This is disclosed, for example, in Japanese Laid-Open Patent Application No. 1-133239. This method is such that servo control is applied so as to fix and maintain the probe electrode near the average position of vertical movement so that the probe electrode may not vertically move without omission in conformity with the value of the recording bit.

Also, when the tunnel current is to be intensified to write information onto the recording layer, the hold control of an actuator (hereinafter referred to as the pre-value hold) has been effected so as to hold the position in the Z direction at a predetermined value so that the spacing between the probe electrode and the recording layer may not be greatly varied by a great current then flowing.

However, the system which effects the control of the spacing between the probe electrode and the recording layer by the use of the average value of the tunnel current suffers from the following three problems:

(1) When the scanning speed of the probe electrode is increased, the tip end portion of the probe electrode may collide with the convex recording bit of the recording layer. Particularly when the shape of the recording bits is not uniform, the possibility of the collision occurring frequently becomes high.

What determines the spacing between the probe electrode and the recording layer is the average value of the tunnel currents flowing in the ON state and the OFF state, respectively. This average value is determined chiefly by the tunnel current when the recording layer is in the ON state. The ON state is the state of the convexly shaped bits in a case where recording is effected by the modulation of the surface shape, and is a state in which the electron density is high and the electrical conductivity with respect to the base electrode has become high in the case of the recording in the modulation of the electron state (the electrical conductivity state). Therefore, the spacing between the probe electrode and the recording layer is affected by the pattern of data rows written on the recording layer, i.e., the detection frequency of the ON state bits.

The tunnel current is controlled by the very minute spacing (usually 1 nm or less) between the probe electrode and the recording layer and therefore, even if use is made of a modulation system which does not have a direct current component such as EFM, any slight variation in the average tunnel current by the difference in substance between data being recorded will result in the collision with the probe electrode at the ON state bit.

Also, from the necessity of reading out data at a high speed, the cutoff frequency of a low-pass filter is set to a sufficiently low value as compared with the signal band frequency of recorded data. However, if the cutoff frequency of the low-pass filter is set to a low value, the probe electrode will not be able to be retracted at a high speed and may collide with the recording layer when a greatly convexly shaped ON state bit by the irregularity of writing during recording is detected.

When the probe electrode collides with the recording layer, not only recorded data are lost but also the probe electrode may be unrecoverably damaged, and the above-noted problem will remarkably reduce the reliability of an information reproducing apparatus utilizing a tunnel current.

(2) If during data writing, the spacing between the probe electrode and the recording layer is pre-value-held and controlled, there may occur irregularity in the shape of written bits. Particularly, in the first bit writing of data rows, the possibility of the contact of the probe electrode with the recording layer shape-modulated by a writing current occurring frequently is high.

The states of an example of the prior art during recording are shown in FIGS. 6, 7 and 8 of the accompanying drawings. FIG. 6 shows the state before the application of a writing pulse voltage, and FIG. 7 shows the state after the application of the writing pulse voltage, i.e., a state in which the surface of the recording layer is melted and expanded by energy poured from the pulse voltage into the recording layer and convexly shaped recording is accomplished rightly.

However, this recording method has a very unstable factor. When an electric current is caused to flow from the probe electrode to the recording layer to thereby melt the recording layer, the recording layer begins to expand. At this time, the spacing between the probe electrode and the recording layer becomes smaller by the amount of expansion of the recording layer. This reduction in the spacing increases the electric current flowing between the probe electrode and the recording layer. This increased electric current further expedites the melting of the recording layer to thereby further expand the recording layer toward the probe electrode. As a result, as shown in FIG. 8, the recording layer collides with the probe electrode and an extremely large recording bit is formed. The formation of such recording bits irregular in size not only reduces the S/N ratio of the signal, but also causes the collision of the probe electrode during the aforedescribed reproduction.

A similar problem has arisen when recording is effected with the electron state of the surface of the recording layer modulated. When the electron state of the surface of the recording layer is modulated, the melting and expansion of the recording layer do not occur, but recording is effected by the modulation of the electrical conductivity through the recording layer between the base electrode and the probe electrode.

However, if a writing pulse voltage is applied when the probe electrode is very close to the recording layer when the probe electrode is pre-value-held, the electron state of the recording layer changes and a state in which the electrical conductivity is high is formed and also, an excessive current exceeding the normal recording level flows to the base electrode. Thereupon, this excessive current heats the base electrode of the recording layer, whereby the base electrode is melted and expanded. Due to such damage of the base electrode, high density recording cannot be accomplished.

(3) As regards the average value control and the pre-value hold control of the spacing between the probe electrode and the recording layer, it is difficult to effect appropriate control for both of initial writing and re-writing.

This is because the control of the spacing between the probe electrode and the recording layer during data writing is determined by the pre-value of the average value of the tunnel current and therefore a proper spacing is not always obtained and there is the possibility of deviation from a proper value occurring. This deviation from the proper spacing is greatly varied by whether the state of the recording layer is initial writing or re-writing. Further, in the case of re-writing, deviation from the proper spacing is also caused by formerly recorded information (ON or OFF).

SUMMARY OF THE INVENTION

The present invention has been made to solve the above-noted problems and has as its object the provision of a system which, in recording and reproduction to which the principle of STM is applied, stabilizes the control of the spacing between a probe electrode and a recording layer to thereby accomplish high information recording density and a high signal reading-out speed and enable re-writing to be stably effected even on a recording medium on which writing has already been effected.

In one aspect of the present invention which achieves the above object, in order to effect the reading-out of a signal from a recording medium at a high speed and without the collision of the probe electrode, the control of the spacing between the probe electrode and the signal recording layer is effected by sampling a tunnel current detected by the probe electrode at the timing of a reproduction clock, and reproduction is effected on the basis of this sampled value.

In another form of the present invention, in order to effect information recording with good reproducibility and at high density, the control variable of a servo control circuit for controlling the spacing between the probe electrode and the recording layer is changed over during the periods before and after a writing pulse is applied to the probe electrode.

In still another form of the present invention, in order to effect re-recording reliably, a prior recording state at a re-writing position is detected and from the result of this detection, an optimal servo control variable and the waveform of a pulse voltage applied are set.

BRIEF DESCRIPTION OF THE DRAWINGS

FIG. 5a14 5d and 5g–5i are timing chart illustrating the recording and erasing operation in FIG. 1.

DESCRIPTION OF THE PREFERRED EMBODIMENT

Figure 1:
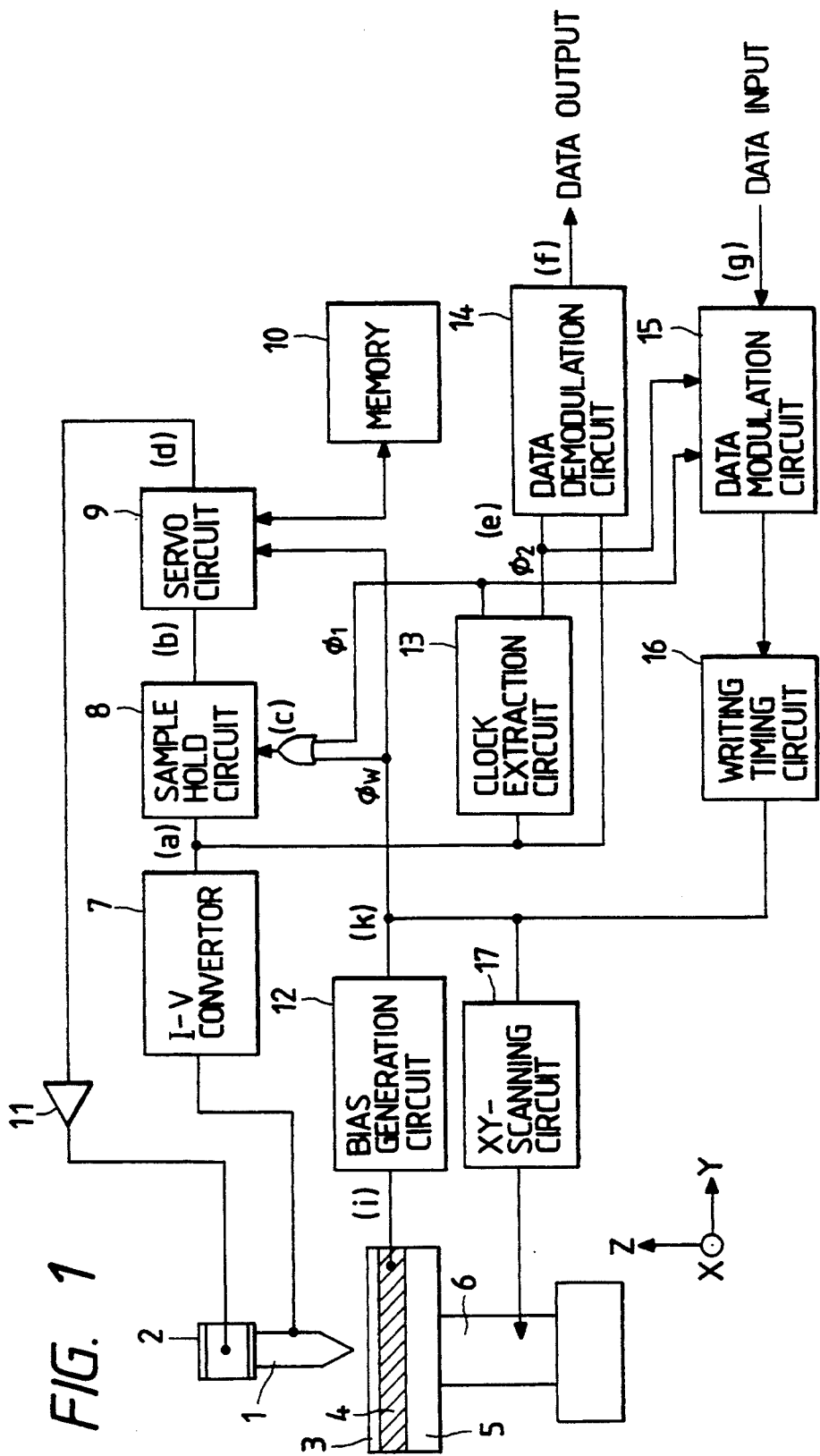
FIG. 1 is a block diagram showing an embodiment of the recording, erasing and reproducing system of the present invention.

An embodiment of a memory apparatus of super-high density and great capacity using the principle of STM will hereinafter be described as an example of an information recording/reproducing apparatus. FIG. 1 is a block diagram of the apparatus of the present embodiment. In FIG. 1, the reference numeral 1 designates a probe electrode, and the reference numeral 2 denotes a piezo-actuator for driving the probe electrode 1 in the Z direction. The reference numeral 3 designates a recording layer, the reference numeral 4 denotes a base electrode, the reference numeral 5 designates a substrate, and the reference numeral 6 denotes an XY stage. The reference numeral 7 designates an I-V converter for detecting a tunnel current flowing between the probe electrode and the base electrode through the recording layer 3 and converting it into a voltage signal. The reference numeral 8 denotes a sample hold circuit for holding the output voltage value (a) of the I-V converter 7 at the timing by OR(c) of clocks $\phi_1$ and $\phi_w$. The reference numeral 9 designates a servo circuit for effecting calculation from the output voltage (b) of the sample hold circuit 8 and calculating a voltage (d) output to a Z-axis control actuator. The reference numeral 10 denotes a memory for storing the control variable of the servo circuit therein, the reference numeral 11 designates a driver for driving the actuator 2, and the reference numeral 12 denotes a bias generation circuit for generating reading-out bias and recording pulse voltage (i) in the base electrode. The reference numeral 13 designates a clock extraction circuit for separating and extracting a reproduction clock signal $\phi_1$ and data recording timing $\phi_2$ recorded on the recording layer from the output of the I-V converter 7. The reference numeral 14 denotes a data demodulation circuit for demodulating data recorded on the recording layer. The reference numeral 15 designates a data modulation circuit for modulating recording data imparted from the outside and sending writing pulse data to a writing timing circuit 16 and the bias generation circuit 12. The writing timing circuit 16 produces timing $\phi_w$ (h) for generating a writing pulse voltage. The reference numeral 17 denotes a scanning circuit for driving and controlling an XY stage so that the probe electrode may pursue data rows on a recording medium.

Figure 2:
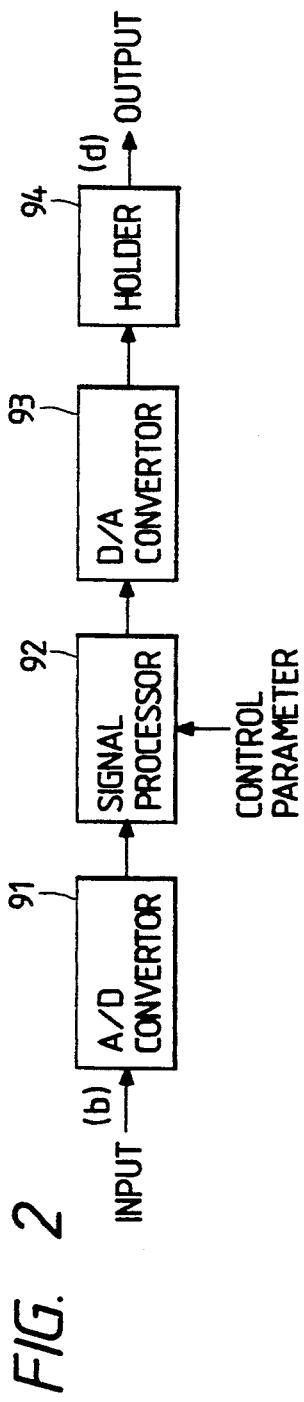
FIG. 2 is a detailed block diagram of a servo control circuit in FIG. 1.
Figure 3:
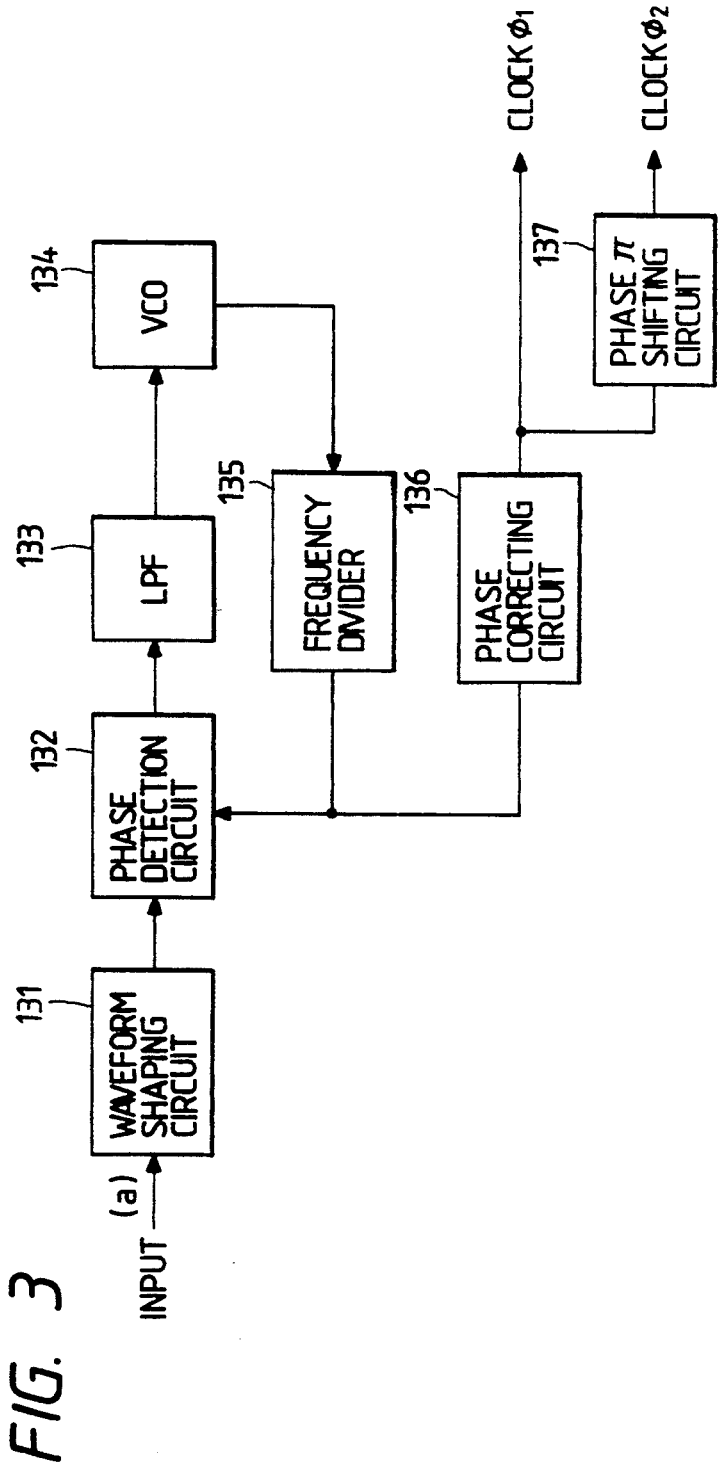
FIG. 3 is a detailed block diagram of a clock extraction circuit in FIG. 1.

FIG. 2 is a detailed block diagram of the servo control circuit 9, and FIG. 3 is a detailed block diagram of the clock extraction circuit 13. In the servo control circuit of FIG. 2, the reference numeral 91 designates an A/D converter for converting the sample hold output signal (b) into a digital signal, and the reference numeral 92 denotes a signal processor for effecting the calculation of servo control. The memory 10 for storing the control variable therein is connected to the signal processor 92. The reference numeral 93 designates a D/A converter for converting the calculation output of the signal processor into an analog voltage, and the reference numeral 94 denotes a holder for eliminating the output glitch of the D/A converter and obtaining a smooth analog output (d).

Also, in the clock extraction circuit of FIG. 3, the reference numeral 131 designates a waveform shaping circuit for shaping the waveform (a) of the I-V conversion output and passing a clock signal component therethrough, the reference numeral 132 denotes a phase detection circuit, the reference numeral 133 designates a low-pass filter, and the reference numeral 134 denotes a voltage control type oscillator (VCO). The phase detection circuit 132 is a circuit for phase-detecting the output of the waveform shaping circuit 131 by a signal obtained by frequency-dividing the oscillation output of the VCO 134 by a frequency divider 135. The VCO 134 effects the oscillation of a frequency proportional to the output voltage of the low-pass filter 133, and the output of this VCO is put out as a reference signal (hereinafter referred to as the reproduction clock signal) which provides the reference during data reproduction. The reference numeral 136 designates a phase correcting circuit, and the reference numeral 137 denotes a phase $\pi$ shifting circuit.

Figure 4:
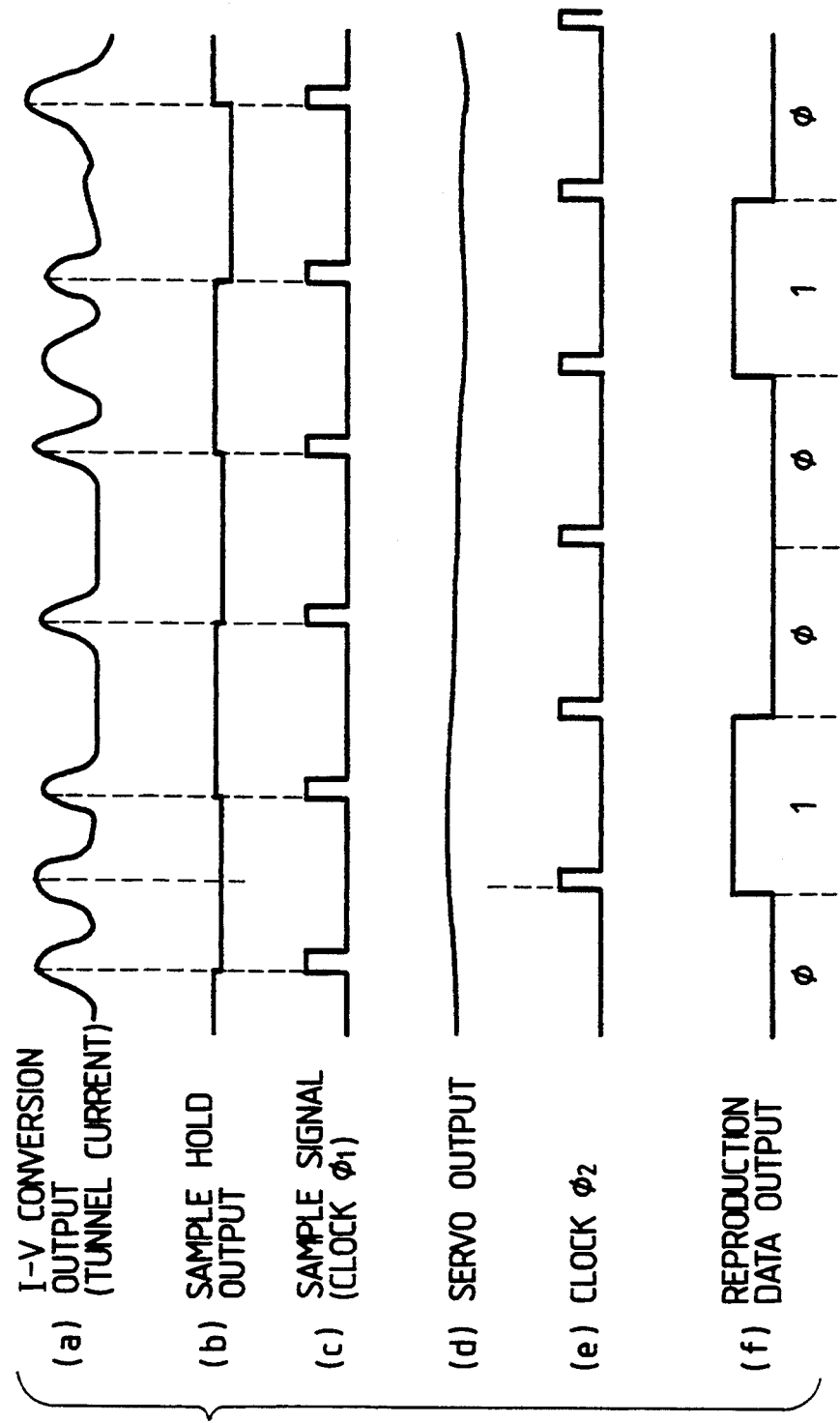
FIG. 4a–4f is a timing chart illustrating the reproducing operation in FIG. 1.
Figure 5:
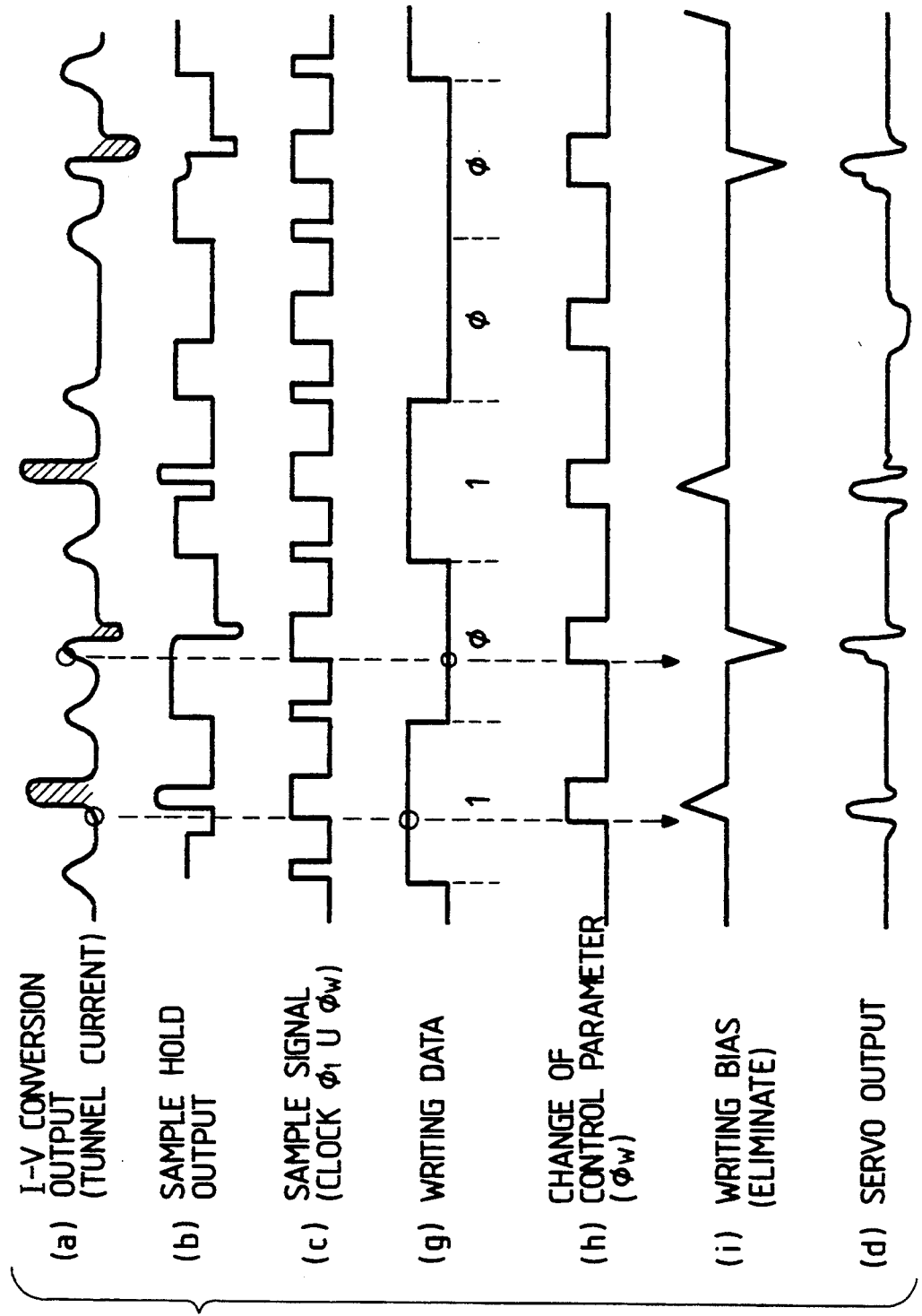
Figure 6:
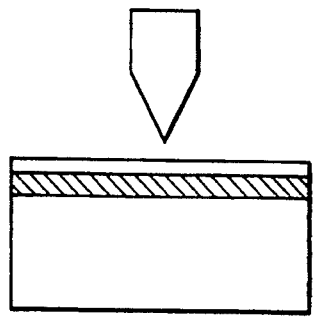
FIG. 6 illustrates the writing operation by an example of the prior art.
Figure 7:
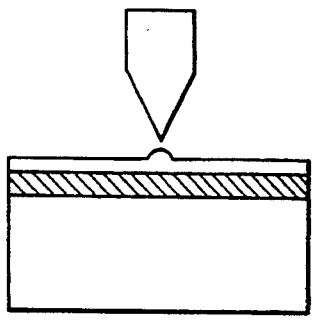
FIG. 7 illustrates the writing operation by the example of the prior art.
Figure 8:
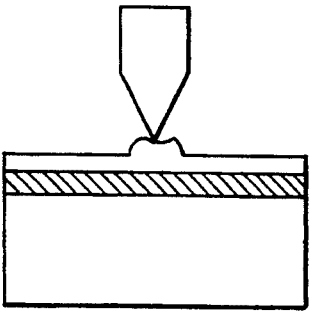
FIG. 8 illustrates the writing operation by the example of the prior art.

FIG. 4 shows a timing chart of the signals of various portions of the apparatus of the present embodiment shown in FIG. 1 during the reproducing operation. FIG. 5 shows a timing chart of the signals of the various portions during the recording operation. The present embodiment is characterized in that on a recording medium, a data bit is written between adjacent reproduction clock signal bits.

Description will first be made of the operation of the apparatus of the present embodiment during data reproduction. The reproducing operation is performed with a reproduction clock signal as the basic timing. The reproduction clock signal is extracted from the signal of recording data. The clock extraction circuit shown in FIG. 3 constitutes a so-called phase locked loop (PLL) circuit, and effects oscillation phase-synchronized with a clock signal component included in a tunnel current signal. A clock $\phi_1$ and a clock $\phi_2$ differing therefrom by a phase $\pi$ are obtained by this circuit.

In FIG. 4, (a) shows an I-V conversion output when the XY stage is driven and the probe electrode scans on a data row written on the recording layer. (b) shows a signal obtained by sampling the I-V conversion output by the use of the reproduction clock $\phi_1$, and this becomes an input signal to the servo circuit which effects the Z control of the probe electrode. As is apparent from FIG. 4, the servo control output (d) of the Z control is effected by the tunnel current value on the reproduction clock signal bit. Therefore, the Z control of the probe electrode can be effected with the reproduction clock signal bit as the reference without being affected by the information of the data bit. Also, as regards the demodulation of the data signal, the I-V conversion output (a) is judged by a data clock $\phi_2$ (e) obtained by phase-shifting from the reproduction clock signal and the logical value (f) of the reproduction signal is obtained. Like this, the Z interval control of the probe electrode is effected by the clock $\phi_1$, and the data bit is reproduced by the clock $\phi_2$ differing in phase from the clock $\phi_1$.

The operations of the apparatus of the present embodiment during data recording and during erasing will now be described with reference to the timing chart of FIG. 5. In FIG. 5, (a) shows the output of the I-V converter 7 and hatched portions indicate a tunnel current created by writing and erasing pulse voltages being applied. (b) shows the output of the sample hold circuit 8, and in the case of the recording operation, it is controlled by a signal (c) which assumes the logical sum of the reproduction clock $\phi_1$ and the writing pulse timing $\phi_w$. When the signal (c) is a true value (1), the input signal (a) is intactly output to (b), and when the signal (c) is a false value (0), the input signal (a) when the signal (c) is the true value immediately before is held and output to (b). Also, $\phi_w$ demands the change (h) of a control parameter to the servo control circuit 9. When the signal $\phi_w$ becomes the true value, the servo control circuit 9 temporarily stores the current servo input (b) and output (d) and a parameter or the like being used for calculation into the memory 10. Then the parameter used during writing is loaded from the memory 10 into the servo control circuit 9. The parameter temporarily stored into the memory 10 is returned after the termination of writing.

The writing pulse voltage is determined by the comparison between the value of the tunnel current (signal (a)) immediately after the rising of $\phi_w$ and the logical value to be recorded. That is, the logical value already written on the recording layer immediately before the writing pulse is generated is detected and compared with a logical value to be now recorded, and only when the two logical values differ from each other, a pulse voltage for inverting the logical values is applied, and when the two logical values coincide with each other, the application of the pulse voltage is not effected.

For the servo control of the probe electrode in Z direction when the writing pulse is applied, a control variable suited for the characteristic of the recording layer is chosen. Where data bits are formed by variations in the shape of the recording layer, the probe electrode is displaced away from the recording layer simultaneously with the application of the pulse. If at this time, the tunnel current is always monitored and the amount of energy poured into the recording layer is controlled, writing better in reproducibility can be accomplished. Also, where the formation of data bits is effected by modulating the electron state of the recording layer, the optimal value of the spacing between the tip end of the probe electrode and the recording layer during the application of the writing pulse is calculated and applied, and during the application of the pulse, the probe electrode is kept so as not to be displaced from this optimal value. If at this time, the tunnel current is monitored and the amount of energy poured into the recording layer is controlled by modulating the applied pulse, writing much better in reproducibility can be accomplished.

When the pulse is to be applied, the application of the pulse may be effected with the movement of the XY stage being temporarily stopped by the utilization of the writing timing $\phi_w$. If such operation is performed, it can be avoided for the recording bit to be distorted in the scanning direction of the recording medium.

The servo control system used in the present invention permits the application of various techniques in accordance with the characteristic of the recording layer. For example, the PID control widely used irrespective of an analog or digital system can easily change the control variable by only three kinds of parameter changes. Further, to effect optimal control, it is preferable to effect the rule control as known in Fuzzy Theory by the use of the tunnel current and the amount of displacement of the probe electrode and the differentiated and integrated values thereof. Also, to further enhance the stability of recording, it is preferable to effect control by the use also of the parameter of the amount of charge or the total amount of energy poured into the recording layer by the applied pulse voltage and the tunnel current.

Also, in the above-described embodiment, signal modulation is effected at the timing whereat the recording data is inserted between the reproduction clock signals, whereas the present invention is not restricted to such modulation system, but use can be made of any modulation system which can extract a clock component from a recorded data bit.

For the recording layer of the present invention used for recording and reproduction, use can be made of various materials if they can detect the information written on the recording layer by a tunnel current flowing between the probe electrode and the recording layer. For example, in a case where unevenness is formed on the surface of the recording layer to thereby accomplish recording, mention may be made of an HOPG (highly-oriented-pyrolithic-graphite) cleavage substrate, an Si wafer, metal thin film of vacuum-evaporated or epitaxial-grown Au, Ag, Pt, Mo, Cu or the like, and glass metals such as $Rh_{25}$, $Zr_{75}$ and $Co_{35}Tb_{65}$. On the other hand, in a case where recording is effected by a change in the electron state of the recording layer, mention may be made of a thin film layer of amorphous Si, $\pi$ electron line organic compound or chalcogen compound.

Also, various shapes and substrate materials of the recording medium used in the present invention are conceivable. For example, as the shapes, mention may be made of a card-like or tape-like substrate, a disk-like substrate, etc., and as the materials, mention may be made of a cleavable crystal substrate such as HOPG or mica, a crystal substrate of Si, sapphire or MgO having its surface polished, molten quartz, Corning No. 7059 glass, etc. Further, as materials usable also as the substrate materials of a tape-like medium, mention may be made of polycarbonate, acryl, PEEK, PET, nylon, etc.

According to the present invention, reproduction of data can be accomplished at a high speed without the probe electrode colliding with the recording layer. Further, even if there is irregularity in the shape or the electron state of data bits recorded on the recording layer, reproduction of high S/N ratio can be accomplished.

Also, during recording, any variation in the recording conditions by the film thickness dependency of the recording layer on locations or the irregularity of the physical property value of the recording layer can be coped with and stable data bits of good reproducibility can be formed.

Also, even on a recording medium on which recording has already been effected, data writing can be effected while erasing is effected. Further, recording and reproduction which are low in the rate of error occurrence even if the re-writing of data is repetitively effected become possible.

What is claimed is:

1. A reproducing apparatus for reading out information recorded on a recording medium, by the utilization of an electric current flowing between the recording medium and a read/write probe opposed thereto, said apparatus comprising:
   means for producing a reference clock signal of timing differing from reading-out timing of the information;
   means for sampling a value of the current flowing between the recording medium and the read/write probe on a basis of the reference clock signal; and
   means for controlling a spacing between the recording medium and the read/write probe on a basis of the sampled value of the current.

2. A reproducing apparatus according to claim 1, wherein the electric current is a tunnel current.

3. A reproducing apparatus according to claim 1, wherein data bits are recorded on the recording medium by variations in a shape of a surface thereof.

4. A reproducing apparatus according to claim 1, wherein data bits are recorded on the recording medium by variations in an electrical conductivity state thereof.

5. A recording apparatus for recording information on a recording medium by utilization of an electric current flowing between the recording medium and a read/write probe opposed thereto, said apparatus comprising:

servo control means for controlling a spacing between the recording medium and the read/write probe on the basis of a predetermined control parameter; and changing means for changing the control parameter to a control parameter suitable to characteristics of a recording layer during a period during which the electric current is enhanced to effect recording.

6. A recording apparatus according to claim 5, wherein the electric current is a tunnel current.

7. A recording apparatus according to claim 5, wherein data bits are recorded on the recording medium by variations in a shape of a surface thereof.

8. A recording apparatus according to claim 5, wherein data bits are recorded on the recording medium by variations in an electrical conductivity state thereof.

9. A recording-reproducing apparatus for intensifying an electric current flowing between a recording medium and a read/write probe opposed thereto and for effecting recording of information on the recording medium during recording by the utilization of the electric current flowing between the recording medium and the read/write probe, and reading out the information recorded on the recording medium during reproduction by the utilization of the electric current flowing between the recording medium and the read/write probe, said apparatus comprising:

means for detecting the electric current at a location on the recording medium where recording is effected, and producing from the detected electric current a first signal representing a logical value of the recorded information;

means for comparing the first signal with a second signal representing a logical value at which information will be recorded; and means for inverting the logical value recorded on the recording medium and effecting recording when the logical values each represented by the first and second signals do not coincide as a result of the comparison by said comparison means.

10. A recording-reproducing apparatus according to claim 9, wherein the electric current is a tunnel current.

11. A recording-reproducing apparatus according to claim 9, wherein data bits are recorded on the recording medium by variations in a shape of a surface thereof.

12. A recording-reproducing apparatus according to claim 9, wherein data bits are recorded on the recording medium by variations in an electrical conductivity state thereof.

* * * * *